A. BRANDES.
LAMP.
No. 174,468. Patented March 7, 1876.
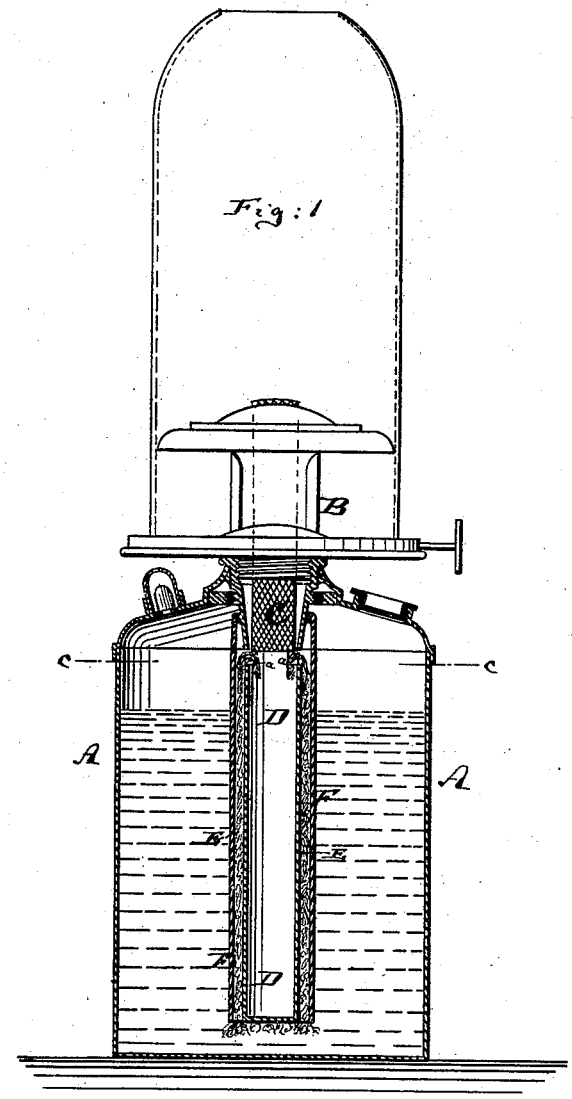
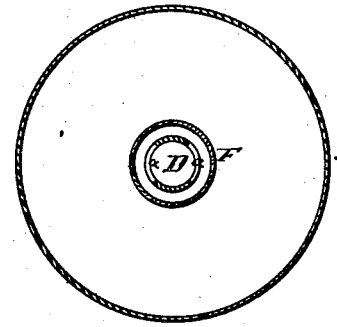
Witnesses:
A. Moraga.
Ernest C. Webb
Inventor:
August Brandes
by his attorney
A. v. Briesen

UNITED STATES PATENT OFFICE.

AUGUST BRANDES, OF HOBOKEN, NEW JERSEY.

IMPROVEMENT IN LAMPS.

Specification forming part of Letters Patent No. 174,468, dated March 7, 1876; application filed February 5, 1876.

*To all whom it may concern:*

Be it known that I, AUGUST BRANDES, of Hoboken, in the county of Hudson and State of New Jersey, have invented a new and Improved Lamp, of which the following is a specification:

Figure 1 is a vertical central section of my improved lamp. Fig. 2 is a horizontal section of the same on the line $c\,c$, Fig. 1.

Similar letters of reference indicate corresponding parts in all the figures.

This invention has for its object to improve oil-lamps so that they can be effectively used with very short wicks, and so also that the oil contained in them will not escape if the lamp is overturned.

My invention consists in securing within the oil-reservoir a pendent cylinder which is closed at the bottom, but perforated near the top, in surrounding said cylinder with fibrous material, which extends through the upper openings within reach of the wick, feeding the oil to the latter, and in confining the fibrous covering to the outer side of said cylinder by an outer tube or shell, all as hereinafter more fully described.

A in the drawings is the reservoir of an oil or fluid lamp, B a suitable burner, and C the lamp-wick, secured in said burner. D is a cylinder suspended from the top of the reservoir or from the burner into the body of the reservoir, to reach nearly to the bottom of the same. The wick C extends into the cylinder, as indicated. The cylinder C is closed at the bottom, but has one or more small apertures, $a$, near its upper end.

E is a covering of cotton or other fibrous material, placed and fastened around the cylinder D along the entire length of the same, or nearly so, and placed also through the aperture or apertures $a$ to reach within contact of the wick. This fibrous covering E feeds the oil by capillary attraction to the wick, supplying just as much as the wick will absorb and no more. It will constitute an effective feed as long as the wick reaches it, as in Fig. 1, and will thus enable the lamp to burn properly, even if the reservoir is nearly empty. If the lamp be upset, oil will not escape into the burner, as the covering E closes the only openings $a$ through which the oil could flow out.

The covering may be fastened to the cylinder D by cords or other means, but I prefer to confine it in position by an outer tube, F, which is open at the bottom, as clearly shown in the drawing.

I claim as my invention—

1. The combination of the oil-reservoir A, with the suspended cylinder D, which is closed at the bottom, and has the aperture $a$ near the top, and with the fibrous covering E, which extends through said aperture $a$, substantially as herein shown and described.

2. The combination, in a lamp-reservoir, of the outer tube F, with the fibrous covering E and perforated cylinder D, substantially as herein shown and described.

A. BRANDES.

Witnesses:
ERNEST C. WEBB,
F. V. BRIESEN.